US007099289B2

(12) United States Patent
Varma

(10) Patent No.: US 7,099,289 B2
(45) Date of Patent: Aug. 29, 2006

(54) AUTOMATIC RETRANSMISSION AND ERROR RECOVERY FOR PACKET ORIENTED POINT-TO-MULTIPOINT COMMUNICATION

(75) Inventor: Subir Varma, San Jose, CA (US)

(73) Assignee: Aperto Networks, Inc., Milpitas, CA (US)

(*) Notice: Subject to any disclaimer, the term of this patent is extended or adjusted under 35 U.S.C. 154(b) by 56 days.

(21) Appl. No.: 10/688,080

(22) Filed: Oct. 17, 2003

(65) Prior Publication Data

US 2004/0136331 A1    Jul. 15, 2004

Related U.S. Application Data

(63) Continuation of application No. 09/689,271, filed on Oct. 11, 2000, now Pat. No. 6,636,488.

(51) Int. Cl.
H04B 7/005 (2006.01)
(52) U.S. Cl. ........................ 370/278; 370/252; 370/347
(58) Field of Classification Search ................ 370/347, 370/469, 252, 349, 390, 337, 278, 282, 329, 370/336, 331, 250, 330, 348; 455/452.2, 455/434, 33.1; 709/226; 375/227
See application file for complete search history.

(56) References Cited

U.S. PATENT DOCUMENTS

| 4,928,096 A | 5/1990 | Leonardo et al. .......... 340/7.22 |
| 5,390,339 A | 2/1995 | Bruckert et al. ............ 455/440 |
| 5,521,926 A | 5/1996 | Ayerst et al. ............... 370/347 |
| 5,546,397 A | 8/1996 | Mahany ..................... 370/310 |
| 5,546,411 A | 8/1996 | Leitch et al. ............... 714/708 |
| 5,553,316 A | 9/1996 | Diepstraten et al. ........ 370/445 |
| 5,598,417 A | 1/1997 | Crisler et al. ............... 370/348 |

(Continued)

FOREIGN PATENT DOCUMENTS

DE    197 28 469 A1    1/1999

(Continued)

OTHER PUBLICATIONS

Annamalai et al. "Analysis and Optimization of Adaptive Multicopy Transmission ARQ Protocols for Time-Varying Channels." IEEE Transactions on Communications, Oct. 1998, pp. 1356-1368, vol. 46, No. 10.

(Continued)

Primary Examiner—John Pezzlo
(74) Attorney, Agent, or Firm—Swernofsky Law Group PC

(57) ABSTRACT

Point to multipoint wireless communication, including automatic retransmission and error recovery for packet oriented point to multipoint communication, which integrates adaptive and dynamic responsiveness for parameters for automatic retransmission using wireless communication. A wireless communication link is divided into a downstream portion and an upstream portion. Parameters are selected for automatic retransmission independently for the downstream portion and the upstream portion of the wireless communication link. A BSC controls the selection of parameters for automatic retransmission for all CPE within a cell. As part of a TDD frame, in which the BSC and the CPE share communication bandwidth using a TDMA technique, the BSC includes its selection of parameters for automatic retransmission to be used by CPE within a control section of the TDD frame. The BSC dynamically and adaptively determines new selected parameters for automatic retransmission, in response to conditions of a wireless communication link with each independent CPE. The BSC dynamically and adaptively allocates acknowledgement time slots within the upstream portion of the TDD frame, for use by each selected CPE. The BSC allocates some portion of the upstream bandwidth as a shared resource and some portion of the upstream bandwidth as unshared when there are messages received but not yet acknowledged. The BSC dynamically and adaptively response to acknowledgement and non-acknowledgement messages from each selected CPE, to integrate the automatic retransmission protocol with the TDD frame and the TDMA technique used within that frame.

15 Claims, 2 Drawing Sheets

U.S. PATENT DOCUMENTS

| | | | |
|---|---|---|---|
| 5,625,875 A | 4/1997 | Whinnett et al. | 455/213 |
| 5,657,325 A | 8/1997 | Lou et al. | 370/334 |
| 5,666,399 A | 9/1997 | Bales et al. | 379/419 |
| 5,669,066 A | 9/1997 | Borg et al. | 455/69 |
| 5,684,791 A | 11/1997 | Raychaudhuri et al. | 370/310.2 |
| 5,729,531 A | 3/1998 | Raith et al. | 370/252 |
| 5,729,541 A * | 3/1998 | Hamalainen et al. | 370/337 |
| 5,778,316 A * | 7/1998 | Persson et al. | 455/434 |
| 5,799,012 A | 8/1998 | Ayerst et al. | 370/336 |
| 5,808,760 A | 9/1998 | Gfeller | 348/27 |
| 5,859,839 A | 1/1999 | Ahlenius et al. | 370/252 |
| 5,896,411 A | 4/1999 | Ali et al. | 3/130 |
| 6,006,073 A | 12/1999 | Glauner et al. | 455/67.11 |
| 6,069,886 A | 5/2000 | Ayerst et al. | 370/336 |
| 6,108,561 A | 8/2000 | Mallinckrodt | 455/522 |
| 6,236,647 B1 | 5/2001 | Amalfitano | 370/335 |
| 6,275,488 B1 | 8/2001 | Cudak et al. | 370/347 |
| 6,374,112 B1 * | 4/2002 | Widegren et al. | 455/452.2 |
| 6,452,915 B1 | 9/2002 | Jorgensen | 370/338 |
| 6,522,650 B1 * | 2/2003 | Yonge et al. | 370/390 |
| 6,636,488 B1 | 10/2003 | Varma | 370/278 |
| 6,643,322 B1 | 11/2003 | Varma et al. | 375/227 |
| 6,807,154 B1 * | 10/2004 | Malmgren et al. | 370/252 |
| 6,842,445 B1 * | 1/2005 | Ahmavaara et al. | 370/349 |

FOREIGN PATENT DOCUMENTS

| | | |
|---|---|---|
| EP | 0 794 631 A2 | 9/1997 |
| EP | 0 869 647 A2 | 10/1998 |
| WO | WO 97/17768 A1 | 5/1997 |
| WO | WO 98/59523 A2 | 12/1998 |
| WO | WO 99/01959 A2 | 1/1999 |
| WO | WO 99/12303 A1 | 3/1999 |
| WO | WO 99/14975 A2 | 3/1999 |
| WO | WO 99/18685 A1 | 4/1999 |
| WO | WO 99/23844 A2 | 5/1999 |
| WO | WO 99/44341 A1 | 9/1999 |
| WO | WO 00/13362 A1 | 3/2000 |
| WO | WO 00/22865 A2 | 4/2000 |
| WO | WO 01/50633 A1 | 7/2001 |
| WO | WO 01/50669 A1 | 7/2001 |
| WO | WO 02/05493 A2 | 1/2002 |
| WO | WO 02/13447 A2 | 2/2002 |
| WO | WO 02/25856 A2 | 3/2002 |
| WO | WO 02/45330 A2 | 6/2002 |
| WO | WO 02/045330 A3 | 6/2002 |
| WO | WO 02/45330 A3 | 6/2002 |

OTHER PUBLICATIONS

Bakshi et al. "Improving Performance of TCP over Wireless Networks." Distributed Computing Systems, Proceedings of the 17th International Conference on Baltimore, MD, USA, May 27-30, 1997, pp. 365-373, Los Alamitos, CA, USA, IEEE Computing Society.

Civanlar et al. "Self-Healing in Wideband Packet Networks." IEEE Network Magazine, Jan. 1990, pp. 35-39, No. 1, New York, USA.

Inoue et al. "Link-Adaptive Resource Scheduling for Wireless Message Transport," IEEE Global Telecommunications Conference, Nov. 8-12, 1998, pp. 2223-2228, vol. 4, IEEE, New York, NY, USA.

Newton. "Newton's Telecom Dictionary." 1998, p. 630, Telecom Books, New York, NY, USA.

* cited by examiner

PARAMETER SETTING
VALUES:
- PHY AND MAC FOR
  UPSTREAM AND
  DOWNSTREAM
- LENGTH OF
  UPSTREAM
  PAYLOADS
- LENGTH OF
  DOWNSTREAM
  PAYLOADS

HIGH-LEVEL
PROTOCOL
STATUS

AUTOMATIC RETRANSMISSION AND ERROR RECOVERY FOR PACKET ORIENTED POINT-TO-MULTIPOINT COMMUNICATION

CROSS-REFERENCE TO RELATED APPLICATION

This application is a continuation of and hereby incorporates by reference and claims benefit of U.S. application Ser. No. 09/689,271, filed Oct. 11, 2000, now U.S. Pat. No. 6,636,488.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This invention relates to wireless communication systems, such as those including automatic retransmission and error recovery for packet oriented point-to-multipoint communication.

2. Related Art

In communication systems, messages from a sender to a receiver using a communication link are sometimes subject to sending errors, such as bit errors, unreasonable sending delay, unintended reordering, and unintended duplication of messages. For example, noise on the communication link can cause bits within messages to be incorrect, generally causing the receiver to be unable to use the message. In a wireless communication system, these problems are exacerbated by a variety of circumstances that are specific to wireless communication. For example, co-channel interference (CCI), multipath and multipoint effects, such as refraction or reflection resulting in intrasymbol interference and intersymbol interference, are often prevalent with wireless communication, and can substantially reduce the reliability of wireless communication links.

One known method in digital communication systems is to implement an automatic retransmission protocol between sender and receiver, so that the receiver acknowledges messages from the sender, and the sender re-transmits those messages not acknowledged by the receiver within a reasonable time. Known automatic retransmission protocols include several parameters, which must generally be selected in response to characteristics of the communication link, to optimize communication throughput between the sender and receiver.

One problem with application of this known method to wireless communication systems is that there are multiple physical characteristics of the wireless communication link, each which is specific to a particular combination of sender and receiver, and each of which can change substantially over relatively short time durations. These multiple physical characteristics can include characteristics of the sender's equipment or of the receiver's equipment, characteristics of objects on or near communication pathways between the sender and the receiver, and characteristics of other communications overlapping communication between the sender and the receiver. For example, the wireless communication environment can include substantial changes in wireless communication link characteristics in the time duration between sending a message and sending an appropriate acknowledgement for that message. This is particularly so for characteristics related to errors in sending information using wireless communication links, including interference such as CCI, and multipath and multipoint effects. Moreover, multiple ones of these physical characteristics can change independently of one another, and can have substantial and relatively unpredictable effects on one another.

Accordingly, selection of a single set of parameters with which to optimize automatic retransmission using a wireless communication link is virtually always suboptimal for communication among multiple senders and multiple receivers. Moreover, selection of parameters with which to optimize automatic retransmission can be subject to substantial data collection and computation; this task is not easily distributed among multiple senders and multiple receivers. Accordingly, it would be advantageous to provide a technique for automatic retransmission and error recovery for packet oriented point to multipoint communication, that is not subject to drawbacks of the known art. Preferably, in such a technique, automatic retransmission and error recovery characteristics are responsive to changes in the characteristics of the communication link between sender and receiver.

SUMMARY OF THE INVENTION

The invention provides a method and system for point to multipoint wireless communication, including automatic retransmission and error recovery for packet oriented point to multipoint communication. The method and system integrates adaptive and dynamic responsiveness for parameters for automatic retransmission using wireless communication, both for single sender and a single receiver, and for sets of multiple senders and multiple receivers.

In a first aspect of the invention, the wireless communication link is divided into a downstream portion and an upstream portion. The method and system selects parameters for automatic retransmission independently for the downstream portion and the upstream portion of the wireless communication link. A base station controller (BSC) controls the selection of parameters for automatic retransmission for all customer premises equipment (CPE) within a cell. As part of a TDD frame, in which the BSC and the CPE share communication bandwidth using a TDMA technique, the BSC includes its selection of parameters for automatic retransmission to be used by CPE within a control section of the TDD frame.

Preferably in this aspect of the invention, the BSC dynamically and adaptively determines new selected parameters for automatic retransmission, in response to conditions of a wireless communication link with each independent CPE. One problem particular to this aspect of the invention, and overcome by the invention, is that when the BSC sends new selected parameters for using the wireless communication link, aspects of each message to be sent will also dynamically vary. These can include the size of each message (in bytes or message symbols), the time duration for each message, and other aspects of each message. Accordingly, in the second aspect of the invention, parameters for automatic retransmission are responsive to a number of bytes successfully sent from a sender to a receiver, rather than responsive to a number of messages successfully sent or a number of symbols successfully sent.

In a second aspect of the invention, upstream retransmission control is placed in the receiver of the upstream communication (i.e., the BSC) rather than the transmitter of the upstream communication (i.e., the CPE). In order to control retransmission, the BSC dynamically and adaptively allocates acknowledgement time slots within the upstream portion of the TDD frame for use by each selected CPE. Thus, the BSC, in addition to determining parameters for automatic retransmission, also determines an amount of bandwidth allocated to each selected CPE for sending messages associated with automatic retransmission (such as acknowledgement or non-acknowledgement messages). As part of this second aspect of the invention, the BSC allocates some portion of the upstream bandwidth as a shared resource and some portion of the upstream bandwidth as unshared (that is, specifically allocated to a selected CPE) when there are messages received but not yet acknowledged.

In a third aspect of the invention, the BSC dynamically and adaptively responds to acknowledgement and non-acknowledgement messages from each selected CPE, to integrate the automatic retransmission protocol with the TDD frame and the TDMA technique used within that frame. In a preferred embodiment, when the BSC sends messages to a selected CPE, the BSC sets a first timeout each time it receives a non-acknowledgement message from that selected CPE; during this first timeout duration, the BSC discards further acknowledgement and non-acknowledgement messages from that selected CPE. Also in a preferred embodiment, when the BSC receives messages from a selected CPE, the BSC sets a second timeout each time it receives an invalid message from the selected CPE; during this second timeout duration, the BSC discards all further messages received from that selected CPE.

The invention provides an enabling technology for a wide variety of applications for communication, so as to obtain substantial advantages and capabilities that are novel and non-obvious in view of the known art. Examples described below primarily relate to wireless communication systems, but the invention is broadly applicable to many different types of communication in which characteristics of the communication link are subject to change.

DETAILED DESCRIPTION OF THE PREFERRED EMBODIMENT

Figure 1:
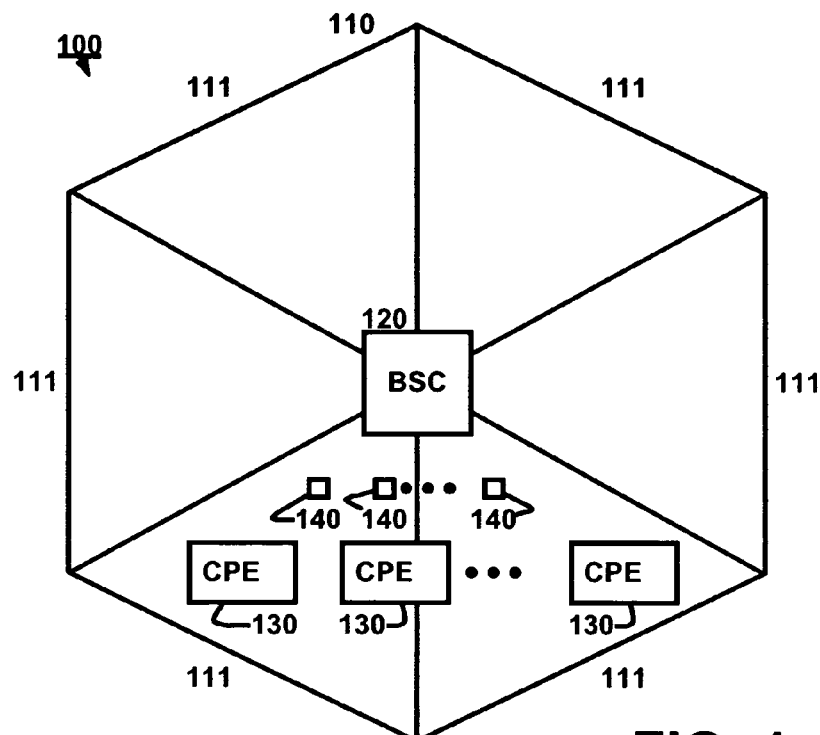
FIG. 1 shows a block diagram of a portion of a system using automatic retransmission and error recovery in a point to multipoint wireless communication.

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

RELATED APPLICATIONS

Inventions described herein can be used in conjunction with inventions described in the following documents.

U.S. patent application Ser. No. 09/475,642, Express Mail Mailing No. EL524780018US, filed Dec. 30, 1999 in the names of Reza Majidi-Ahy, Subir Varma, Khuong Ngo, Jean Fuentes and Paul Truong, now U.S. Pat. No. 6,650,623, titled "Adaptive Link Layer for Point to Multipoint Communication System."

U.S. patent application Ser. No. 09/475,716, Express Mail Mailing No. EL524780021US, filed Dec. 30, 1999 in the names of Reza Majidi-Ahy, Joseph Hakim, and Subir Varma, now U.S. Pat. No. 6,654,384, titled "Integrated Self-Optimizing Multi-Parameter and Multi-Variable Point to Multipoint Communication System."

U.S. patent application Ser. No. 09/540,674, Express Mail Mailing No. EL524781512US, filed Mar. 31, 2000, in the name of Reza Majidi-Ahy, attorney docket number 164.1001.01, titled "Robust Topology Wireless Communication Using Broadband Access Points."

U.S. patent application Ser. No. 09/604,784, Express Mail Mailing No. EL524781225US, filed Jun. 26, 2000 in the names of Reza Majidi-Ahy, attorney docket number 164.1010.01, titled "High-Capacity Scalable Integrated Wireless Backhaul for Broadband Access Networks." and U.S. patent application Ser. No. 09/620,826, Express Mail Mailing No. EL524780959US, filed Jul. 21, 2000 in the name of Reza Majidi-Ahy, Joseph Hakim, and Subir Varma, titled "Integrated, Self-Optimizing, Multi-Parameter/Multi-Variable Point-to-Multipoint Communication System [II]."

Each of these documents is hereby incorporated by reference as if fully set forth herein. This application claims priority of each of these documents. These documents are collectively referred to as the "Incorporated Disclosures."

Lexicography

The following terms refer or relate to aspects of the invention as described below. The descriptions of general meanings of these terms are not intended to be limiting, only illustrative.

base station controller (BSC)—in general, a device for performing coordination and control for a wireless communication cell. There is no particular requirement that the base station controller must be a single device; in alternative embodiments, the base station controller can include a portion of a single device, a combination of multiple devices, or some hybrid thereof.

communication link—in general, an element for sending information from a sender to a recipient. Although in a preferred embodiment the communication links referred to are generally wireless line of sight point to point communication links, there is no particular requirement that they are so restricted.

customer premises equipment (CPE)—in general, a device for performing communication processes and tasks at a customer location, and operating in conjunction with the base station controller within a wireless communication cell. There is no particular requirement that the customer premises equipment must be a single device; in alternative embodiments, the customer premises equipment can include a portion of a single device, a combination of multiple devices, or some hybrid thereof.

IP parameters—in general, a set of characteristics or parameters relating to an IP layer for a communication link.

media-access-control (MAC) parameters—in general, with reference to a wireless communication link, a set of characteristics or parameters relating to media access control of a communication link. For example, MAC parameters can include (a) a number of payload data bytes assigned per message, (b) a frequency of acknowledgement messages and a number of message retransmission attempts, (c) a fraction of the communication link allocated to downstream versus upstream communication, and the like.

physical (PHY) parameters—in general, with reference to a wireless communication link, a set of characteristics or parameters relating to physical transmission of information on a communication link. For example, physical characteristics can include (a) a symbol transmission rate, (b) a number of payload data bits assigned per symbol, (c) a number of error detection or correction bits assigned per symbol, and the like.

QoS parameters—in general, a set of characteristics or parameters relating to QoS (quality of service) for a communication link.

wireless communication system—in general, a communication system including at least one communication link that uses wireless communication techniques.

wireless transport layer—in general, a set of protocols and protocol parameters for sending and receiving information using wireless transport. In a preferred embodiment, the wireless transport layer is part of a multilayer systems architecture, in which the wireless transport layer is built using a physical transport layer, and the wireless transport layer is used by a logical transport layer such as IP.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Context

The context of the invention is similar to that of the Incorporated Disclosures.

A system using adaptive point to multipoint wireless communication in a wireless communication system operates as part of a system in which devices coupled to a network (such as a computer network) send messages, route and switch messages, and receive messages. In a preferred embodiment, devices coupled to (and integrated with) the network send, route, and receive these messages as sequences of packets, each of which has a header including delivery information and a payload including data. In a preferred embodiment, packet format conforms to the OSI model, in which an application protocol (layer 5, such as FTP), uses a transport protocol (layer 4, such as TCP), which uses a network protocol (layer 3, such as IP), which uses a media access control (MAC) protocol (layer 2), which uses a physical transport technique (layer 1).

The system using adaptive point to multipoint wireless communication is described herein with regard to layer 1 and layer 2, particularly as it applies to interactions between layer 1 and layer 2 and between those layers and layer 3. However, concepts and techniques of the invention are also applicable to other layers of the OSI model. The application gives examples of cases where the type of application in the application layer (layer 5) could be incorporated into embodiments of the invention to improve communication. Adapting those concepts and techniques to such other layers would not require undue experimentation or further invention, and is within the scope and spirit of the invention.

System Elements

FIG. 1 shows a block diagram of a portion of a system using automatic retransmission and error recovery in a point to multipoint wireless communication.

A system 100 includes a wireless communication cell 110 (or a portion thereof), a base station controller (BSC) 120, one or more customer premises equipment (CPE) 130, and one or more (possibly partially) interfering or reflecting obstacles 140.

The wireless communication cell 110 includes a generally hexagon-shaped region of local surface area, such as might be found in a metropolitan region. Use of generally hexagon-shaped regions is known in the art of wireless communication because they are able to tile a local region with substantially no gaps. However, although in a preferred embodiment the wireless communication cell 110 includes a generally hexagon-shaped region, there is no particular requirement for using that particular shape; in alternative embodiments it may be useful to provide another shape or tiling of the local surface area.

In FIG. 1, a portion of the cell 110, herein called a "sector" 111, includes a generally triangular-shaped region of local surface area, disposed so that a set of six sectors 111 are combined to form a single cell 110. Thus, the BSC 120 is disposed at or near one corner of the sector 111, while CPE 130 are disposed within the sector 111. Moreover, obstacles 140 are disposed within the sector 111 or at junctions of multiple sectors 111.

Although the invention is primarily described with regard to a single sector 111, there are substantial applications of the invention to interaction between multiple sectors 111 within a cell 110, and to interaction between sectors 111 in multiple cells 110. These substantial applications of the invention are described at least in part in this application. Moreover, other and further substantial applications of the invention with regard to multiple sectors 111, both within a single cell 110 and among multiple cells 110, would be clear to those skilled in the art of wireless communication after perusal of this application, and would not require undue experimentation or further invention.

The BSC 120 includes a processor, program and data memory, mass storage, and one or more antennas for sending or receiving information using wireless communication techniques.

Similar to the BSC 120, each CPE 130 includes a processor, program and data memory, mass storage, and one or more antennas for sending or receiving information using wireless communication techniques.

Obstacles 140 might include buildings, other construction, electromagnetically active elements such as radio transmitters and repeaters, other electromagnetic elements such as power lines or weather effects, and possibly mobile objects such as vehicles.

Although the invention is primarily described with regard to non-moving obstacles 140, it would be clear to those of ordinary skill in the art of wireless communication, after perusal of this application, that even non-moving obstacles 140 might present substantial variation over time in characteristics of communication links between the BSC 120 and selected CPE 130. Moreover, there are substantial applications of the invention to cells 110 and sectors 111 in which there are moving obstacles 140. Although these substantial applications of the invention are not described in great detail herein, other and further substantial applications of the invention with regard to moving obstacles 140, both within a single cell 110 and among multiple cells 110, would be clear to those skilled in the art of wireless communication after perusal of this application, and would not require undue experimentation or further invention.

Communication among devices within the wireless communication cell 110 is preferably conducted on a one-to-one basis between each CPE 130 and the BSC 120. Thus, the BSC 120 communicates with each CPE 130, and each CPE 130 communicates with the BSC 120. In a preferred embodiment, CPE 130 do not communicate directly with other CPE 130. However, in alternative embodiments, CPE 130 may communicate directly with other CPE 130, with the characteristics of such communication being controlled either by the BSC 120, by one CPE 130 selected by the BSC 120, or by one CPE 130 mutually agreed to among the communicating CPE 130.

Communication between the BSC 120 and each CPE 130 is conducted using a TDD technique, in which time durations are divided into repeated individual frames, each one of which includes a "downstream" portion and an "upstream" portion. Unlike existing protocols in which transmissions are controlled by the transmitting side, the BSC 120 controls transmissions for both upstream and downstream directions, without specific requests from CPE 130.

Time Division Duplex (TDD) Frame

Figure 2:
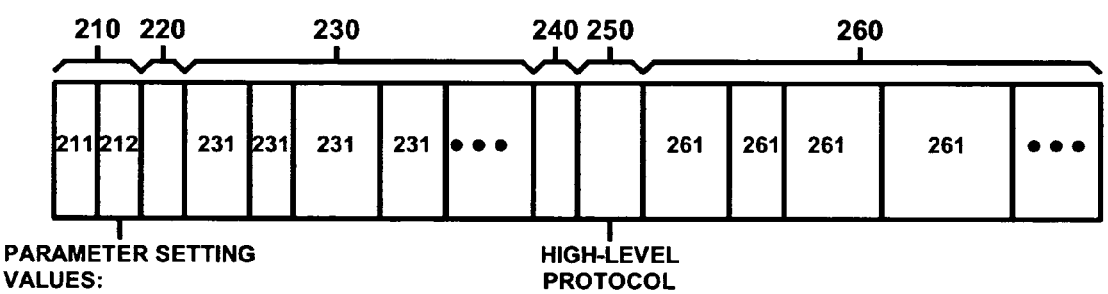
FIG. 2 shows a time division duplex frame used in a system as in FIG. 1.

FIG. 2 shows a time division duplex frame used in a system as in FIG. 1.

During the downstream portion of each frame, the BSC 120 transmits, thus sending information to one or more CPE 130. During the upstream portion of each frame, each CPE 130 is potentially allocated a time slot for transmission, thus for sending information to the BSC 120. TDD techniques are known in the art of wireless communication.

A time division duplex (TDD) frame 200 includes a time-synchronization portion 210, a first guard time 220, a downstream portion 230, a second guard time 240, a status-synchronization portion 250, and an upstream portion 260.

The time-synchronization portion 210 includes a first symbol 211 indicating the beginning of the TDD frame 200, and a sequence of parameter setting values 212 for each CPE 130. The BSC 120 uses the parameter setting values 212 to inform each selected CPE 130 individually and separately of (a) the PHY and MAC parameters the BSC 120 is using to send messages to that selected CPE 130, and (b) the PHY and MAC parameters the selected CPE 130 should use to send messages to the BSC 120 during its allocated part of the upstream portion 260.

The first guard time 220 includes a time duration sufficient for the BSC 120 to assure that all CPE 130 do not interfere with each other when receiving from the BSC 120 or sending to the BSC 120.

The downstream portion 230 includes a sequence of downstream payload elements 231, each sent by the BSC 120 to a selected CPE 130. The BSC 120 determines a length for each of these downstream payload elements 231 and sends that information with the parameter setting values 212 in the time-synchronization portion 210. In alternative embodiments, the BSC 120 may divide the CPE 130 into classes and allocate one or more downstream payload elements 231 for each class of CPE 130. For example, the BSC 120 may allocate one or more downstream payload elements 231 for broadcast or multicast messages.

The second guard time 240 includes a time duration sufficient for the BSC 120 to assure that the downstream portion 230 and the status-synchronization portion 250 do not interfere.

The status-synchronization portion 250 includes a sequence of status information so that the BSC 120 can agree with each selected CPE 130 regarding higher-level protocol status out-of-band from those higher-level protocols.

Similar to the downstream portion, the upstream portion 260 includes a sequence of upstream payload elements 261, each sent by a selected CPE 130 to the BSC 120. The BSC 1120 (not the CPE 130) determines a length for each of these upstream payload elements 261 and sends that information with the parameter setting values 212 in the time-synchronization portion 210. In alternative embodiments, the BSC 120 may divide the CPE 130 into classes and allocate one or more upstream payload elements 261 for each class of CPE 130, such as for upstream bandwidth contention.

Method of Operation

Figure 3:
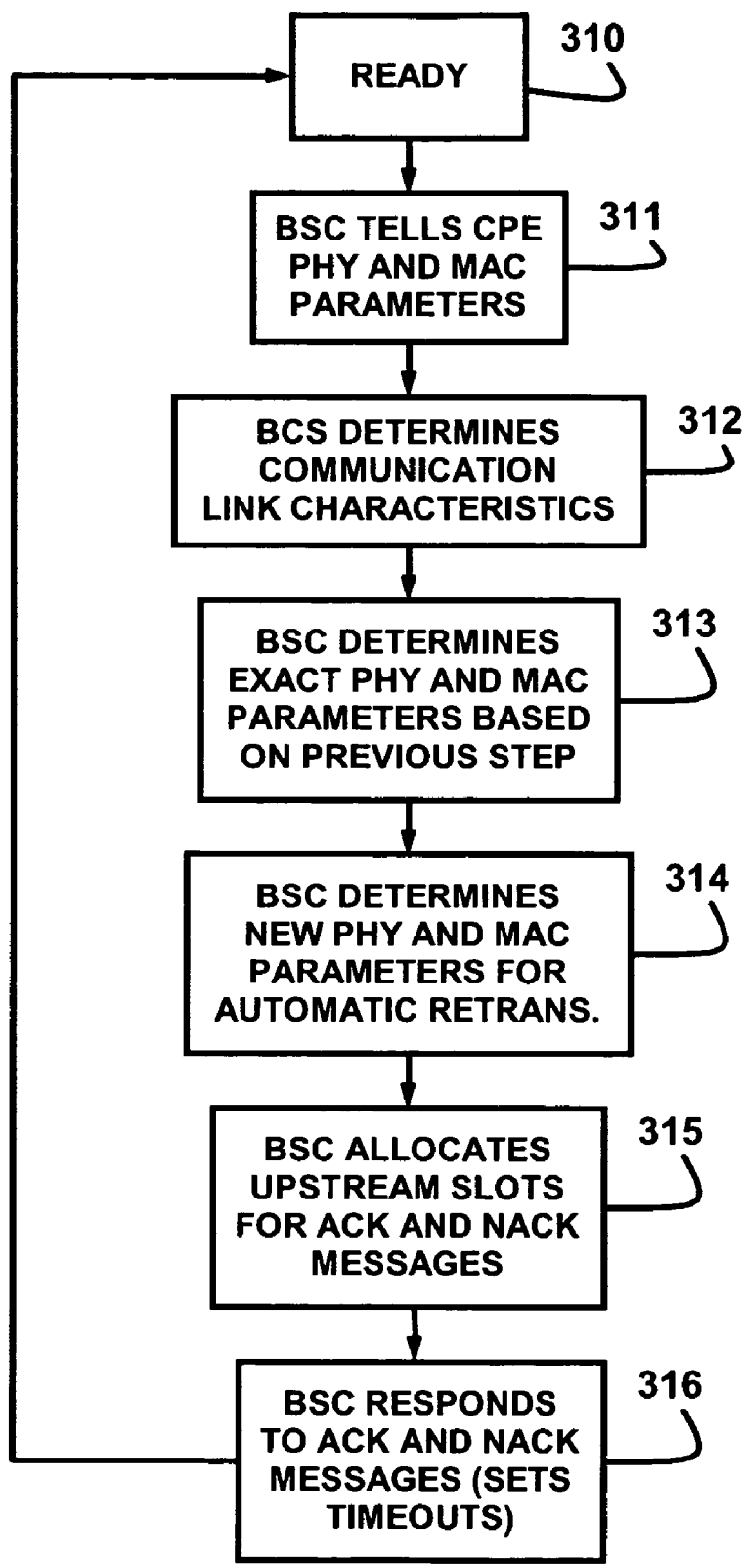
FIG. 3 shows a process flow diagram of a method for operating a system as in FIG. 1.

FIG. 3 shows a flow diagram of a method for operating a system as in FIG. 1.

A method 300 includes a set of flow points and a set of steps. The system 100 performs the method 300. Although the method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except where so indicated.

At a flow point 310, the BSC 120 and the CPE 130 are ready to begin a TDD frame.

At a step 311, the BSC 120 and the CPE 130 conduct communication using a TDD frame. As part of this step, the BSC 120 directs the CPE 130 regarding which physical parameters and MAC parameters to use.

At a step 312, the BSC 120 determines characteristics of the communication link with the CPE 130, in response to performance of the communication during the previous TDD frame.

At a step 313, the BSC 120 determines exact values for the physical parameters and MAC parameters in response to characteristics of the communication link.

At a step 314, the BSC 120 determines new values for the physical parameters and MAC parameters for automatic retransmission in response to results of the previous step.

The BSC 120 preferably determines these automatic retransmission parameters dynamically and adaptively for all CPEs 130 in cell 110. The automatic retransmission parameters preferably are determined independently for each upstream portion and each downstream portion and independently for each CPE.

In order to account for differing characteristics of transmission and retransmission among the CPEs (e.g., message size and duration, symbol size, and other aspects), parameters for retransmission preferably are responsive to a number of bytes successfully transmitted rather than a number of messages or symbols successfully transmitted.

At step 315, the BSC 120 dynamically and adaptively allocates acknowledgement time slots within upstream portion 260 of each TDD frame for use by the CPEs 130. As part of this step, the BSC 120 preferably allocates some portion of the upstream bandwidth as a shared resource and some portion of the upstream bandwidth as unshared (that is, specifically allocated to selected CPEs) when there are messages received but not yet acknowledged.

Thus, control of upstream retransmission is placed within the BSC, not the CPE. This control allows the BSC 120 to distribute acknowledgement slots for plural CPEs across plural TDD frames, thereby allowing the BSC 120 to prevent the acknowledgement slots from consuming too much bandwidth.

At step S316, the BSC 120 dynamically and adaptively responds to acknowledgement and non-acknowledgement messages from each selected CPE 130 so as to integrate the automatic retransmission protocol with the TDD frame and the TDMA technique used within that frame.

In the preferred embodiment, when the BSC 120 sends messages to a selected CPE 130, the BSC 120 sets a first timeout each time the BSC 120 receives a non-acknowledgement message from that selected CPE. During this first timeout duration, the BSC 120 discards further acknowledgement and non-acknowledgement messages from that selected CPE 130.

Also in the preferred embodiment, when the BSC 120 receives messages from a selected CPE 130, the BSC 120 sets a second timeout each time it receives an invalid message from the selected CPE 130. During this second timeout duration, the BSC 120 discards all further messages received from that selected CPE 130.

After step 316, the BSC 120 and the CPE 130 have performed one step of sending and receiving information using a TDD frame. The flow point 310 is reached repeatedly and the steps thereafter are performed repeatedly, for each TDD frame.

Pseudo-code for implementing the preferred embodiment of the invention substantially as discussed above is included in a technical appendix to this application.

Generality of the Invention

The invention has general applicability to various fields of use, not necessarily related to the services described above. For example, these fields of use can include one or more of, or some combination of, the following:

The invention is applicable to other forms of wireless communication, such as frequency division multiple access (FDMA) or code division multiple access (CDMA, also known as spread spectrum communication);

The invention is applicable to any non-wireless communication, in which relative effectiveness or efficiency of communication can be achieved from dynamically adjusting communication parameters, such as physical parameters or MAC parameters. For example, the invention can be generalized to non-wireless communication using modems in which equalization parameters are to be dynamically adjusted.

The invention is applicable to other wireless communication systems, such as satellite communication systems and (microwave tower or other) point to point transmission systems.

The invention is applicable to both fixed wireless communication systems, in which customer premises equipment do not move relative to the BSC 120, and to mobile wireless communication systems, and which customer premises equipment move substantially relative to the BSC 120.

The invention is applicable to both a single sender and a single receiver, and sets of multiple senders and multiple receivers.

Other and further applications of the invention in its most general form, will be clear to those skilled in the art after perusal of this application, and are within the scope and spirit of the invention.

Although preferred embodiments are disclosed herein, many variations are possible which remain within the concept, scope, and spirit of the invention, and these variations would become clear to those skilled in the art after perusal of this application.

TECHNICAL APPENDIX

Pseudo-code copyright 2000 Aperto Networks, Inc.

```
4.0 Downstream ARQ (BSC Tx, CPE Rx)
4.1 Parameters (Control PDU Handler)
    ARQWindowSize;    // Size of the ARQ window. Set to 2^(n-1) bytes, where n is the
                      // number of bits in the Sequence Number field
    maxAcksLost;      // Maximum number retries for the upstream ACKs, after which
                      // the CPE is re-ranged
    maxReqRetries;    // Maximum number of retries for a REQ packet.
4.2 BSC Tx (reqWin, scWin, curWin, ackWin)
4.2.1 Initialize (Control PDU Handler)
    reqWinOff = 0;    // Sequence number of next byte to be queued
    scWinOff = 0;     // Sequence number of next byte to be transmitted by BSC
    curWinOff = 0;    // Sequence number of next byte the CPE expects
    ackWinOff = 0;    // Sequence Number of next byte awaiting acknowledgment
                      // Allocate empty SIDQ_EL and initialize pointers
    newSidQEl = AllocateSidQEl( );
    newSidQEl->EOL = TRUE;
    writeElPtr = ackElPtr = curElPtr = scElPtr = newSidQEl;
    ackPtr = curPtr = scPtr = 0;
    retryCnt = 0;     // Used to decide when to drop a packet
    NumAcksLost = 0;  // Used for link adaptation
4.2.2 PDU Arrival (Classifier, Policer)
    // Classify the WPDU
        find sidQ (PDU);                         // Classifier
    // Enqueue the WPDU on the overflow section of the sidQ
        newSidQEl = AllocateSidQEl( );           // Policer
        newSidQEl->EOL = TRUE;                   // Policer
        writeElPtr->next = newSidQEl;            // Policer
        writeElPtr->length = PDU.length;         // Policer
        writeElptr->txMsgPtr = PDU.txMsgPtr;     // Policer
```

TECHNICAL APPENDIX-continued

Pseudo-code copyright 2000 Aperto Networks, Inc.

```
            writeElPtr->pktPtr = PDU.packet;        // Policer
            writeElPtr = newSidQEl;                 // Policer
        // Traffic shaping may be done before the packet is moved out of the overflow section.
        // These updates must be done last to avoid timing problems with USG.
            reqWinOff = reqWinOff + PDU.size;       // Policer
            writeElPtr->EOL = FALSE;                // Policer
4.2.3 MAP Construction (Scheduler)
    while (space left for data in downstream TDD frame) {
        sidQCtrl = SID that Scheduler selects;
        bytesInQueueToSchedule = reqWinOff - scWinOff;
        // Always try to schedule bytes for SIDs without ARQ.
        // For SIDs with ARQ, we need to make sure that we have not
        // exhausted our window before we try to schedule some bytes.
        if ( (sidQCtrl.sidCfgBits.arq = FALSE) OR
            ((scWinOff + bytesScheduled - ackWinOff) < ARQWindowSize) ) {
            DATA_GRANT_IE.winOff = scWinOff;
            DATA_GRANT_IE.payloadSize = bytesScheduled; // Includes delimiter
bytes
            scWinOff = scWinOff + DATA_GRANT_IE.payloadSize;
            allocate ticks for WPDU in downstream portion of TDD Frame;
            update scElPtr and scPtr to reflect bytes scheduled;
            // Mark SID as needing ACK
            if ( (sidQCtrl.sidCfgBits.ack = TRUE) AND (!sidQCtrl.ackFlag) ) {
                sidQCtrl.ackFlag = TRUE;
                add to list of downstream SIDs needing ACK; } } } // while (space
left)
    // Schedule only one ACK per SID for a frame.
    // We can schedule ACKs for SIDs without ARQ. This is needed for link adaptation.
    for each SID on list of downstream SIDs needing ACK {
        // If there are bytes remaining to be acked, allocate space for the
        // ACK even if the current frame has no WPDUs scheduled for this SID
        if (scWinOff != ackWinOff) {
            Allocate ticks for ACK in the upstream portion of TDD frame;
            ACK_IE.sid = this SID; }
    else {
        delete from list of SIDs needing ACK;
        sidQCtrl.ackFlag = FALSE; }
    } // for (each SID on list)
4.2.4 MAP Arrival (Hardware)
    if (data grant IE) {
        // Was a packet dropped or retransmitted?
        if((sidQCtrl.sidCfgBits.arq = TRUE) AND
        (curWinOff!=DATA_GRANT_IE.winOff)){
            // if possible, check (ackWinOff == DATA_GRANT_IE.winOff)
            curWinOff = ackWinOff;
            Reset the cur pointers to the ack pointers; }
        // Need pseudocode for HW packet fragmentation
        Build a WPDU using the curElPtr and curPtr
        WPDU.winOff = curWinOff; // Should we use data grant ie not curWin?? JF
        curWinOff = curWinOff + DATA_GRANT_IE.payload
        Update curElPtr and curPtr to reflect bytes transmitted }
4.2.5 WPDU Transmit (Hardware)
    transmit built WPDU;
    if (sidQCtrl.sidCfgBits.arq == FALSE)
        return any completely transmitted packet;
4.2.6 ACK Arrival (Scheduler)
    // Calculate the number of ACKed bytes
    NumAcksLost = 0;
    ackByteCnt = ACK.winOff - ackWinOff;
    // Only free buffers here if ARQ. Otherwise they'd have been freed right after transmit.
    if (sidQCtrl.sidCfgBits.arq == TRUE) {
        // Any bytes ACKed?
        if (ackByteCnt) {
            ackWinOff = ackWinOff + ackByteCnt;
            tempElPtr = ackElPtr;
            update ackPtr and ackElPtr to account for the bytes ACKed;
            if (tempElPtr != ackElPtr)
                free SIDQ_ELs between ackElPtr and tempElPtr;
            if (ACK.nakFlag clear)
                retryCnt = 0; }
        // Any bytes NACKed?
        if (ACK.nakFlag set) {
            if ((ackByteCnt == 0) && (time > threshold)) {
                threshold = time at which the last (partially) allocated TDD frame
                    ends;
                retryCnt = retryCnt + 1; }
            // When the retry count expires, drop only the first packet in the list.
```

TECHNICAL APPENDIX-continued

Pseudo-code copyright 2000 Aperto Networks, Inc.

```
            if (retryCnt > sidQCtrl.maxRetry) {
                // pktPtr points to the first byte in the packet, and ackPtr is the off-
    set
                // from pktPtr to the next byte to ack
                dropBytes = ackElPtr->length – ackPtr;
                tempElPtr = ackElPtr;
                update ackElPtr to next packet in list;
                ackPtr = 0;
                free (tempElPtr);
                // Account for any bytes that need to be retransmitted
                reqWinOff –= dropBytes;    // Scheduler asks Policer to do this and
    does
                                            // not schedule any more bytes for this
SID
                                            // until it is done.
                inform link adaptation task that we dropped an EPDU }
            // We have to reschedule some bytes for retransmission
            scWinOff = ackWinOff;
            update sc pointers to ack pointers;
        } // if nakByteCnt
    } // if ARQ
4.2.7 ACK Lost (Scheduler)
    NumAcksLost = NumAcksLost + 1;
    if (NumAcksLost > maxAcksLost)
        ReRange CPE;
    // Note: ACK may be lost if the corresponding MAP was lost. However it is not clear how
    // a lost MAP event may be detected by the BSC.
    // Note: If a CPE cannot be ReRanged, the Link Adaptation Task needs to send a message
    // to the Control PDU Handler to flush the sidQ.
4.3 CPE Rx (curWin)
4.3.1 Initialize (Control PDU Handler)
    // CPE S/W does not care about winOffs
    curWinOff = 0; // Sequence number of the next WPDU to transmit/receive
    cur pointers = NULL;
4.3.2 WPDU Arrival (Hardware)
    // Never keep bad wpdus
    if (crc error) {
        Set NAK flag;
        Discard(WPDU);
        discard any packet currently being reassembled; }
    else if (no energy detected)
        Set NAK flag;
    // If an out of sequence wpdu arrives and this SID has ARQ, discard the
    // wpdu until we receive the next sequence number we are expecting.
    else if ( (sidQCtrl.sidCfgBits.arq = TRUE) AND (WPDU.winOff != curWinOff) )
        Discard(WPDU);
    // Receive the WPDU. Either it's in correct sequence, or the SID has no ARQ and
    // doesn't care about the sequence.
    else {
        curWinOff = WPDU.winOff + WPDU.payloadSize;
        // Need pseudocode for HW packet reassembly
        // if a new packet arrives and we were previously assembling a packet,
        // we discard the old packet and accept the new.
        if ((WPDU.catPtr == 0) and (curPtr != 0)) {
            Discard(Partial assembled packet);
            curPtr = 0;
            curElPtr = NULL; }
        // if possible, check the new packet for incorrect length, cuz if it's wrong, and
        // we don't find it here, it'll be a real bugger to track down
        if (curElPtr.length != curPtr??)
            discard packet; }
4.3.3 ACK Transmission (Hardware)
    // When wpdus are scheduled for SIDs with ACK, the Scheduler
    // will create an IE in the same MAP or in the following MAP
    // for the ACK.
    if (sidQCtrl.sidCfgBits.ack == TRUE) {
        ACK.status = ACK or NAK;
        ACK.winOff = curWinOff;
        ACK.linkParms = modemStatus;
        Transmit ACK; }
5.0 Upstream ARQ (CPE Tx, BSC Rx)
5.1 CPE Tx (reqWin, curWin, ackWin)
5.1.1 Initialize (Control PDU Handler)
    reqWinOff = 0; // Sequence Number for the number of the next byte awaiting
    // transmission.
    curWinOff = 0; // Sequence Number of the next byte that the CPE expects to tx. The
    // sequence number in the MAP may be less than this, in case of
```

TECHNICAL APPENDIX-continued

Pseudo-code copyright 2000 Aperto Networks, Inc.

```
            // re-transmissions.
            ackWinOff = 0; // Sequence Number of the next byte awaiting acknowledgment.
            // Allocate empty SIDQ_EL and initialize pointers
            newSidQEl = AllocateSidQEl( );
            newSidQEl->EOL = TRUE;
            writeElPtr = ackElPtr = curElPtr = readElPtr = newSidQEl;
            ackPtr = curPtr = 0;
    5.1.2 PDU Arrival (Classifier, Policer)
            // Classify the WPDU
            find sidQCtrl (PDU); // Classifier
            // Create new empty SidQEl to terminate list
            newSidQEl = AllocateSidQEl( ); // Policer
            newSidQEl->EOL = TRUE; // Policer
            // Enqueue the WPDU on the overflow section of the sidQ. EOL bit should already be set.
            writeElPtr->next = newSidQEl; // Policer
            writeElPtr->length = PDU.length; // Policer
            writeElptr->txMsgPtr = PDU.txMsgPtr; // Policer
            writeElPtr->pktPtr = PDU.packet; // Policer
            writeElPtr = newSidQEl; // Policer
            if (sidQCtrl->flushFlag not set) {
                wait till activeFlowFifo has room;
                activeFlowFifo = PDU.sidNumber; // Policer notifies Hw }
            // Traffic shaping may be done before the packet is moved out of the overflow section
            reqWinOff = reqWinOff + PDU.size; // Policer
            writeElPtr->EOL = FALSE; // Policer
    5.1.3 REQ Transmission (HW)
            if (state = Idle) {
                PDU arrival
                Compute Defer
                state = Deferring; }
            else if (state = Deferring) {
                map arrives with req IE opportunity
                    REQ.winOff = curWinOff;
                    REQ.reqWinOff = reqWinOff;
                    Tx REQ;
                    state = GrantPending;
            else if (state = GrantPending)
                // The BSC received our REQ packet
                map arrives with upstream data IE
            transmit WPDU;
            // Any more bytes left in SID queue?
            if (reqWin − curWin)
                state = GrantPending;
            // SID queue is empty
            else {
                numReqRetries = 0;
                state = Idle; }
            // Our REQ packet did not get to the BSC
            map arrives with no grant IE or grant pending IE
                numReqRetries = numReqRetries + 1;
                if (numReqRetries > maxReqRetries) {
                    HW writes SID num plus flush flag in fifo;
                    HW does not tx anymore pdus until sw writes to ACTIVE_SID_FIFO;
                    HW sets sidQCtrl->flushFlag;
                    numReqRetries = 0;
                    state = Idle; }
                else
                    state = Deferring;
    5.1.4 MAP Arrival (Hardware)
            if (MAP missing) {
                calculate time of next MAP;
                assume largest MAP size;
                program Broadcom to receive next MAP; }
            if (Data Grant IE) {
                // If ARQ, don't do anything until a grant gives us the expected offset
                if((sidQCtrl.sidCfgBits.arq == FALSE) OR
                    (DATA_GRANT_IE.winOff==curWinOff)){
                    WPDU.payloadSize = DATA_GRANT_IE.payloadSize;
                    Confirm that allocated ticks are sufficient to accommodate WPDU;
                    WPDU.req = reqWinOff;
                    WPDU.winOff = curWinOff; } }
            if ((MAP ACK IE) OR (MAP NAK IE)) {
                if (sidQCtrl.sidCfgBits.arq == TRUE) {
                    ackByteCnt = ACK.winOff − ackWinOff;
                    ackWinOff = ACK.winOff;
                    // Any bytes ACKed?
                    if (ackByteCnt) {
```

TECHNICAL APPENDIX-continued

Pseudo-code copyright 2000 Aperto Networks, Inc.

```
            update ackElPtr to account for the ackByteCnt;
            ackPtr = 0; }
        if (MAP NAK IE) {
            reset cur pointers and winOff to ack pointers and winOff; }
        // Notify SW of ACK, so it can free buffers.
        write SID number and set ACK flag in the WM_TX_PKT_FIFO; } // if
ARQ
    } // if ACK or NAK IE
    if (MAP FLUSH IE) {
        // The Scheduler decided it was time to give up on the packet, so drop the
        // EOL or End Of List packet.
        write SID number and set flush flag in WM_TX_PKT_FIFO;
        set sidQCtrl->flushFlag;
        // Force data transmission on this SID to halt. This gives us time to
        // update the reqWinOff.
        HW does not tx anymore pdus until SW writes to ACTIVE_SID_FIFO;
        go to req state Idle; }
5.1.5 Process Tx Pkt Fifo (WMAC Driver)
    read SID number from WM_TX_PKT_FIFO;
    if (ACK flag) {
        free SIDQ_ELs from readElPtr to ackElPtr;
        readElPtr = ackElPtr; }
    if (flush flag)
        send Flush msg to Policer;
5.1.6 Flush Packet (Policer)
    // Software temporarily has write access to all sidQCtrl fields.
    drop EOL PDU;
    update ackElPtr to skip remainder of dropped PDU;
    ackPtr = 0;
    curWinOff = ackWinOff;
    reqWinOff = reqWinOff - remainder of dropped PDU;
    update curPtr and curElPtr to ackPtr and ackElPtr;
    clear sidQCtrl->flushFlag;
    // Kick off another REQ if there are any bytes still on the queue.
    if (req WinOff - curWinOff)
        write SID number to ACTIVE_SID_FIFO;
5.1.7 WPDU Transmission (Hardware)
    extract WPDU.payloadSize bytes from position curWinOff in SID queue;
    advance curElPtr and curPtr by WPDU.payloadSize bytes;
    curWinOff = curWinOff + WPDU.payloadSize;
    if (sidQCtrl.sidCfgBits.arq == FALSE)
        return any completely transmitted packet;
5.2 BSC Rx (reqWin, scWin, curWin)
5.2.1 Initialize (Control PDU Handler)
    scWinOff = 0; // Sequence Number of next byte to be transmitted by CPE
    curWinOff = 0; // Sequence Number of the next byte that the BSC expects
    reqWinOff = 0; // Cumulative count of number of bytes received at CPE
    retryCnt = 0; // Number of times we have sent the packet unsuccessfully.
5.2.2 REQ Arrival (Scheduler, Hardware)
    if (sidQCtrl.sidCfgBits.arq == FALSE) {
        scWinOff = REQ.winOff; // Scheduler
        reqWinOff = REQ.reqWinOff; // Scheduler }
5.2.3 MAP Construction (Scheduler)
    // Clear ErrorRecovery state for each new frame
    state = normal;
    while (Space left in current Upstream TDD frame) {
        sidQCtrl = SID that Scheduler selects;
        bytesInQueueToSchedule = reqWinOff - scWinOff;
        // Always try to schedule bytes for SIDs without ARQ.
        // For SIDs with ARQ, we need to make sure that we have not
        // exhausted our window before we try to schedule some bytes.
        if ( (sidQCtrl.sidCfgBits.arq == FALSE) OR
            ((scWinOff + BytesScheduled - curWinOff) < ARQWindowSize) ) {
            Allocate ticks for WPDU in upstream portion of TDD frame;
            DATA_GRANT_IE.payloadSize = BytesScheduled;
            DATA_GRANT_IE.winOff = scWinOff;
            scWinOff = scWinOff + DATA_GRANT_IE.payloadSize; } }
5.2.4 WPDU Arrival (Hardware)
    // Discard any bad wpdus
    if (CRC Error) {
        discard(WPDU);
        discard any packet currently being reassembled; }
    // If ARQ, discard any out of sequence wpdus
    else if(sidQCtrl.sidCfgBits.arq == TRUE) AND (WPDU.winOff != curWinOff) ) {
        Discard(WPDU);
        Hw writes burst status to Fifo;
        send bad or dropped status to Scheduler; }
```

TECHNICAL APPENDIX-continued

Pseudo-code copyright 2000 Aperto Networks, Inc.

```
    // Good wpdu
    else {
        curWinOff = WPDU.winOff + WPDU.payloadSize;
        // Discard packet cases -
        // if a new packet arrives and we were previously assembling a packet
        // if the packet arrives with an incorrect length
        if ((WPDU.catPtr == 0) and (curPtr != curElPtr.pktPtr)) {
            Discard(Partial assembled packet);
            curPtr = 0;
            curElPtr = NULL; }
        // if possible, check the new packet for incorrect length
        if (curElPtr.length != (curPktPtr – curElPtr.pktPtr))
            discard packet;
        send good status to Scheduler; }
5.2.5 WPDU Status Arrives (Scheduler)
    if (wpdu good) AND ((sidQCtrl.sidCfgBits.arq == FALSE) OR
        (ackWinOff == WPDU.winOff)) {
        retryCnt = 0;
        reqWinOff = WPDU.reqWinOff;
        ackWinOff = WPDU.winOff + WPDU.length;
        // WMAC Driver needs to calculate this and send the new winOff to the Scheduler
        if (sidQCtrl.sidCfgBits.arq == FALSE)
            scWinOff = WPDU.winOff + WPDU.length; }
    else if ( ((wpdu lost) OR (wpdu bad)) AND (sidQCtrl.sidCfgBits.arq == TRUE) ) {
        // By checking the state for ErrorRecovery, this means that we just
        // reset the Scheduler's window for the first bad WPDU in the frame.
        // The state is reset to normal during upstream map construction.
        // If a MAP is lost, then the wpdus will be lost.
        if ( (time > ErrorRecoveryTime) AND (retryCnt <= sidQCtrl.maxRetry) ) {
            nakFlag = TRUE;
            ErrorRecoveryTime = Tick Count at end of last scheduled upstream frame;
            scWinOff = curWinOff;
            // Should ackWinOff = curWinOff? Verify.
            update sc pointers to cur pointers;
            retryCnt = retryCnt + 1; } }
5.2.6 Flush Packet (Scheduler, Policer)
    // When the retry count expires, drop the packet being assembled.
    if (retryCnt > maxRetry) // Scheduler {
        // When a packet is dropped, the CPE must make a new request.
        scWinOff = curWinOff; // Scheduler
        Update sc pointers to cur pointers; // Scheduler
        retryCnt = 0; // Scheduler
        flushFlag = 1; // Scheduler
        Send msg to Link Adaptation Routine; // Scheduler
        send msg to Policer with sidNum; // Scheduler
        reqWinOff = curWinOff; }
5.2.7 Build MAP ACK IE Types (Scheduler)
    if (sidQCtrl.sidCfgBits.arq == TRUE) {
        if (nakFlag) {
            NACK.sidNumber = sid;
            NACK.winOff = curWinOff;
            Put NACK in MAP;
            nakflag = FALSE; }
        else if (flushFlag) {
            FLUSH.sidNumber = sid;
            FLUSH.winOff = curWinOff;
            Put FLUSH in MAP;
            flushflag = 0; }
        else {
            ACK.sidNumber = sid;
            ACK.winOff = ackWinOff;
            Put ACK in MAP; } }
```

What is claimed is:

1. A method of controlling selection of parameters for automatic retransmission in a point-to-multipoint wireless communication link having an upstream portion for communicating data from a plurality of customer premises equipment (CPE) to a base station controller (BSC) and a downstream portion for communicating data from the base station controller to the plurality of customer premises equipment, the method comprising the steps of:

selecting physical and media access control (MAC) parameters for automatic retransmission, the physical and MAC parameters for the downstream portion being selected independently for each customer premises equipment of the plurality of customer premises equipment and physical and MAC parameters for the upstream portion being selected independently for said each customer premises equipment;

including the physical and MAC parameters in a control section of a frame, the control section for sending control information downstream; and allocating a first part of the upstream portion as shared and some part of the upstream portion as unshared when there are messages received but not yet acknowledged.

2. The method of claim 1, wherein the physical and MAC parameters are dynamically selected based on previous communication between the base station controller and said each customer premises equipment.

3. The method of claim 1, further comprising the step of sending the control section of the frame downstream from the base station controller to the customer premises equipment, whereby the base station controller controls physical and MAC parameters for both upstream and downstream retransmission.

4. The method of claim 1, further comprising dynamically and adaptively determining new selected physical and MAC parameters for automatic retransmission, wherein the base station controller determines the new selected physical and MAC parameters in response to conditions of a wireless communication link with said each CPE.

5. The method of claim 4, wherein the physical and MAC parameters for automatic retransmission are selected responsive to a number of bytes successfully sent.

6. A base station controller configured to communicate with a plurality of customer premises equipment, the base station controller comprising:

a transmitter configured to communicate information downstream to the customer premises equipment;

a receiver configured to receive upstream information communicated by the customer premises equipment;

a processor configured to execute instructions to control the transmitter and the receiver; and a memory storing a set of instructions, the memory being coupled to the processor, the set of instructions comprising instructions that, when executed by the processor, cause the processor to select physical and MAC parameters for automatic retransmission of information between the base station controller and the customer premises equipment, the physical and MAC parameters for downstream retransmission being selected independently for each customer premises equipment of the plurality of customer premises equipment, and physical and MAC parameters for upstream retransmission being selected independently for said each customer premises equipment;

include the physical and MAC parameters in a control section of a frame, the control section being for communicating control information downstream; and allocate a first part of the upstream information as shared and some part of the upstream information as unshared when there are messages received but not yet acknowledged.

7. The base station controller according to claim 6, wherein the instructions that cause the processor to select comprise instructions that, when executed by the processor, cause the processor to select dynamically the physical and MAC parameters for automatic retransmission based on previous communication between the base station controller and said each customer premises equipment.

8. The base station controller according to claim 6, wherein the set of instructions further comprises instructions that, when executed by the processor, cause the processor to direct the transmitter to send the control section of the frame downstream from the base station controller to the customer premises equipment, whereby the base station controller controls the physical and MAC parameters for both upstream and downstream retransmission.

9. The base station controller according to claim 6, wherein the set of instructions further comprises instructions that, when executed by the processor, cause the processor to determine dynamically and adaptively new selected physical and MAC parameters for automatic retransmission, wherein the base station controller determines the new selected physical and MAC parameters in response to conditions of a wireless communication link with said each customer premises equipment.

10. The base station controller according to claim 9, wherein the instructions that, when executed by the processor, cause the processor to select the physical and MAC parameters for automatic retransmission cause the processor to select the physical and MAC parameters responsive to a number of bytes successfully sent between the base station controller and the customer premises equipment.

11. An article of manufacture comprising a memory with a set of instructions stored in the memory, the set of instructions comprising instructions that, when executed by a processor configured to cause receiver and transmitter of a base station controller to communicate with a plurality of customer premises equipment, cause the processor to select physical and MAC parameters for automatic retransmission of information between the base station controller and the customer premises equipment, the physical and MAC parameters for downstream retransmission from the base station controller to the customer premises equipment being selected independently for each customer premises equipment of the plurality of customer premises equipment, and physical and MAC parameters for upstream retransmission from the customer premises equipment to the base station controller being selected independently for said each customer premises equipment;

include the physical and MAC parameters in a control section of a frame, the control section being for sending control information downstream; and allocate a first part of upstream information as shared and some part of the upstream information as unshared when there are messages received but not yet acknowledged.

12. The article of manufacture according to claim 11, wherein the instructions that cause the processor to select comprise instructions that, when executed by the processor, cause the processor to select dynamically the physical and MAC parameters for automatic retransmission based on previous communication between the base station controller and said each customer premises equipment.

13. The article of manufacture according to claim 11, wherein the set of instructions further comprises instructions that, when executed by the processor, cause the processor to direct the transmitter to send the control section of the frame downstream from the base station controller to the customer premises equipment, whereby the base station controller controls the physical and MAC parameters for both upstream and downstream retransmission.

14. The article of manufacture according to claim 11, wherein the set of instructions further comprises instructions that, when executed by the processor, cause the processor to determine dynamically and adaptively new selected physical and MAC parameters for automatic retransmission, wherein the base station controller determines the new selected physical and MAC parameters in response to conditions of a wireless communication link with said each customer premises equipment.

15. The article of manufacture according to claim 11, wherein the instructions that, when executed by the processor, cause the processor to select the physical and MAC parameters for automatic retransmission cause the processor to select the physical and MAC parameters responsive to a number of bytes successfully sent between the base station controller and the customer premises equipment.

* * * * *